(12) United States Patent
Sakawaki et al.

(10) Patent No.: US 11,162,503 B2
(45) Date of Patent: Nov. 2, 2021

(54) MAGNETIC BEARING DEVICE AND FLUID MACHINE SYSTEM USING SAME

(71) Applicant: DAIKIN INDUSTRIES, LTD., Osaka (JP)

(72) Inventors: Atsushi Sakawaki, Osaka (JP); Kazuya Hirata, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 222 days.

(21) Appl. No.: 16/321,318

(22) PCT Filed: Aug. 18, 2016

(86) PCT No.: PCT/JP2016/003771
§ 371 (c)(1),
(2) Date: Jan. 28, 2019

(87) PCT Pub. No.: WO2018/033945
PCT Pub. Date: Feb. 22, 2018

(65) Prior Publication Data
US 2019/0170151 A1    Jun. 6, 2019

(51) Int. Cl.
*F04D 29/058* (2006.01)
*F04D 27/00* (2006.01)
(Continued)

(52) U.S. Cl.
CPC ......... *F04D 29/058* (2013.01); *F04D 19/048* (2013.01); *F04D 27/00* (2013.01);
(Continued)

(58) Field of Classification Search
CPC .... F04D 29/058; F04D 19/048; F04D 27/001; F04D 29/051; H02K 7/09; F16C 32/0489;
(Continued)

(56) References Cited

U.S. PATENT DOCUMENTS 7,564,670 B2 * 7/2009 Kozaki ............... F16C 32/0446
361/139
7,843,098 B2 * 11/2010 Coenen ............... F16C 32/0451
310/90.5
(Continued)

FOREIGN PATENT DOCUMENTS

JP    4-40308 U    4/1992
JP    H07-139546 A    5/1995
(Continued)

OTHER PUBLICATIONS

International Search Report for PCT/JP2016/003771 (PCT/ISA/210) dated Nov. 15, 2016.

*Primary Examiner* — Peter J Bertheaud
(74) *Attorney, Agent, or Firm* — Birch, Stewart, Kolasch & Birch, LLP

(57) ABSTRACT

A magnetic bearing device includes a magnetic bearing including a plurality of electromagnets, a displacement sensor configured to output an output signal in accordance with a displacement of a shaft, and a controller configured to control the electromagnets. The controller compensates for a change in levels of the output signal, the change occurring in accordance with a change in ambient temperature around the displacement sensor, based on one or more reference values correlating with the change in levels of the output signal. The one or more reference values are detected for use in controlling the rotary electric machine, a fluid machine system including the rotary electric machine, or an apparatus including the fluid machine system.

6 Claims, 10 Drawing Sheets

(51) Int. Cl.
  *F04D 19/04* (2006.01)
  *F04D 29/051* (2006.01)
  *F16C 32/04* (2006.01)
  *H02K 7/09* (2006.01)
  *F04D 13/06* (2006.01)
  *F04D 29/048* (2006.01)

(52) U.S. Cl.
  CPC ......... *F04D 27/001* (2013.01); *F04D 29/051* (2013.01); *F16C 32/0446* (2013.01); *F16C 32/0451* (2013.01); *F16C 32/0476* (2013.01); *H02K 7/09* (2013.01); *F04D 13/06* (2013.01); *F04D 29/048* (2013.01); *F16C 32/04* (2013.01)

(58) Field of Classification Search
  CPC .............. F16C 32/0451; F16C 32/0446; F16C 32/0476
  See application file for complete search history.

(56) References Cited

U.S. PATENT DOCUMENTS

| | | | |
|---|---|---|---|
| 10,895,282 B2 * | 1/2021 | Hirata | ................ F16C 32/0444 |
| 2007/0278884 A1 | 12/2007 | Kozaki et al. | |
| 2009/0134727 A1 | 5/2009 | Coenen et al. | |

FOREIGN PATENT DOCUMENTS

| JP | 8-54020 A | 2/1996 |
|---|---|---|
| JP | 2001-214934 A | 8/2001 |
| JP | 2008-157439 A | 7/2008 |

* cited by examiner

MAGNETIC BEARING DEVICE AND FLUID MACHINE SYSTEM USING SAME

TECHNICAL FIELD

The present invention relates to a magnetic bearing device and a fluid machine system using magnetic bearings.

BACKGROUND ART

Systems including rotary electric machines such as electric motors use magnetic bearings in some cases to support shafts without any physical contact. Typical magnetic bearings control the positions of the shafts by controlling electromagnetic force of electromagnets based on displacements of the shaft detected by displacement sensors.

Outputs of the displacement sensors include what is called drift that occurs in accordance with a change in ambient temperature. To accurately control the positions of the shafts, something has to be done to remove the effects of the drift. To remove the effects of the drift, for example, temperature sensors are provided near the displacement sensors, and the outputs of the temperature sensors are used to offset the drift that occurs in the displacement sensors (see Patent Document 1, for example).

CITATION LIST

Patent Document

PATENT DOCUMENT 1: Japanese Unexamined Patent Publication No. H07-139546

SUMMARY OF THE INVENTION

Technical Problem

However, there is little space around the shaft, and, in some cases, temperature sensors cannot be installed near the displacement sensors. Even if there is a space for providing temperature sensors, installing the temperature sensors leads to an increase in manufacturing costs.

The present invention is conceived in view of the above problems. It is therefore an object of the present invention to provide a magnetic bearing device that can compensate for a change in levels of an output signal of a displacement sensor, the change occurring in accordance with a change in temperature of the displacement sensor and a change in ambient temperature, without providing a temperature sensor near the displacement sensor.

Solution to the Problem

To solve the problems above, a magnetic bearing device according to a first aspect of the present invention includes: a magnetic bearing (21, 22) including a plurality of electromagnets (51 to 54) configured to apply electromagnetic force to a shaft (5) connected to a rotary electric machine (4); a displacement sensor (31, 32) configured to output an output signal in accordance with a displacement of the shaft (5); and a controller (40) configured to control the electromagnets (51 to 54). The controller (40) compensates for a change in levels of the output signal, the change occurring in accordance with a change in ambient temperature around the displacement sensor (31, 32), based on one or more reference values (R). The one or more reference values (R) correlate with the change in levels of the output signal and are detected for use in controlling the rotary electric machine (4), a fluid machine system (1) including the rotary electric machine (4), or an apparatus (100) including the fluid machine system (I). The controller (40) controls the electromagnets (51 to 54) based on the compensated output signal for the change in levels of the output signal.

This configuration uses the one or more reference values (R) detected for use in controlling the rotary electric machine (4) or the like to compensate for a change in levels of the output signal of the displacement sensor (31, 32).

A second aspect is an embodiment of the first aspect. In the second aspect, the controller (40) compensates for the change in levels of the output signal by transforming the output signal using a transformation law including one or more parameters, and the controller (40) corrects the one or more parameters in accordance with the one or more reference values (R).

This configuration facilitates accurate compensation for the change in levels of the output signal.

A third aspect is an embodiment of the second aspect. In the third aspect, the controller (40) corrects the one or more parameters by using a result of determination as to whether amplitudes of the one or more reference values (R) are within a predetermined range.

This configuration allows the magnetic bearing device to correct the parameters of the transformation law in accordance with, for example, whether the state of a system including the magnetic bearing device has stabilized.

A fourth aspect is an embodiment of any one of the first to the third aspects. In the fourth aspect, the fluid machine system (1) is a compressor included in a refrigerant circuit (110). The rotary electric machine (4) is an electric motor for driving the compressor (1). The controller (40) uses any one of detection values or a value obtained from a combination of two or more of the detection values as the one or more reference values (R). The detection values are a rotational speed of the rotary electric machine (4), a temperature detected in a control board (160a) on which a control device for the rotary electric machine (4) is mounted, a refrigerant pressure and a refrigerant flow rate in the refrigerant circuit (110), and a current value of the rotary electric machine (4).

This configuration allows the magnetic bearing device included in a system with a refrigerant circuit to have the advantages obtained according to the first to the third aspects.

A fluid machine system according to a fifth aspect of the present invention includes the magnetic bearing device (10) according to any one of the first to the fourth aspects, a rotary electric machine (4), and a fluid machine (3) connected to the rotary electric machine (4) by a shaft (5).

This configuration allows the fluid machine system to have the effects that can be achieved by the magnetic bearing device above.

Advantages of the Invention

The magnetic bearing device according to the above aspects can compensate for a change in levels of an output signal of a displacement sensor, the change occurring in accordance with a change in temperature of the displacement sensor and a change in ambient temperature, without providing a temperature sensor near the displacement sensor.

DESCRIPTION OF EMBODIMENTS

Embodiments of the present invention will be described in detail below with reference to the drawings. The embodiments below are merely exemplary ones in nature, and are not intended to limit the scope, applications, or use of the invention.

First Embodiment

The following describes, for example, an air conditioner including a compressor including a magnetic bearing device according to an embodiment of the present invention.

<General Configuration>

Figure 1:
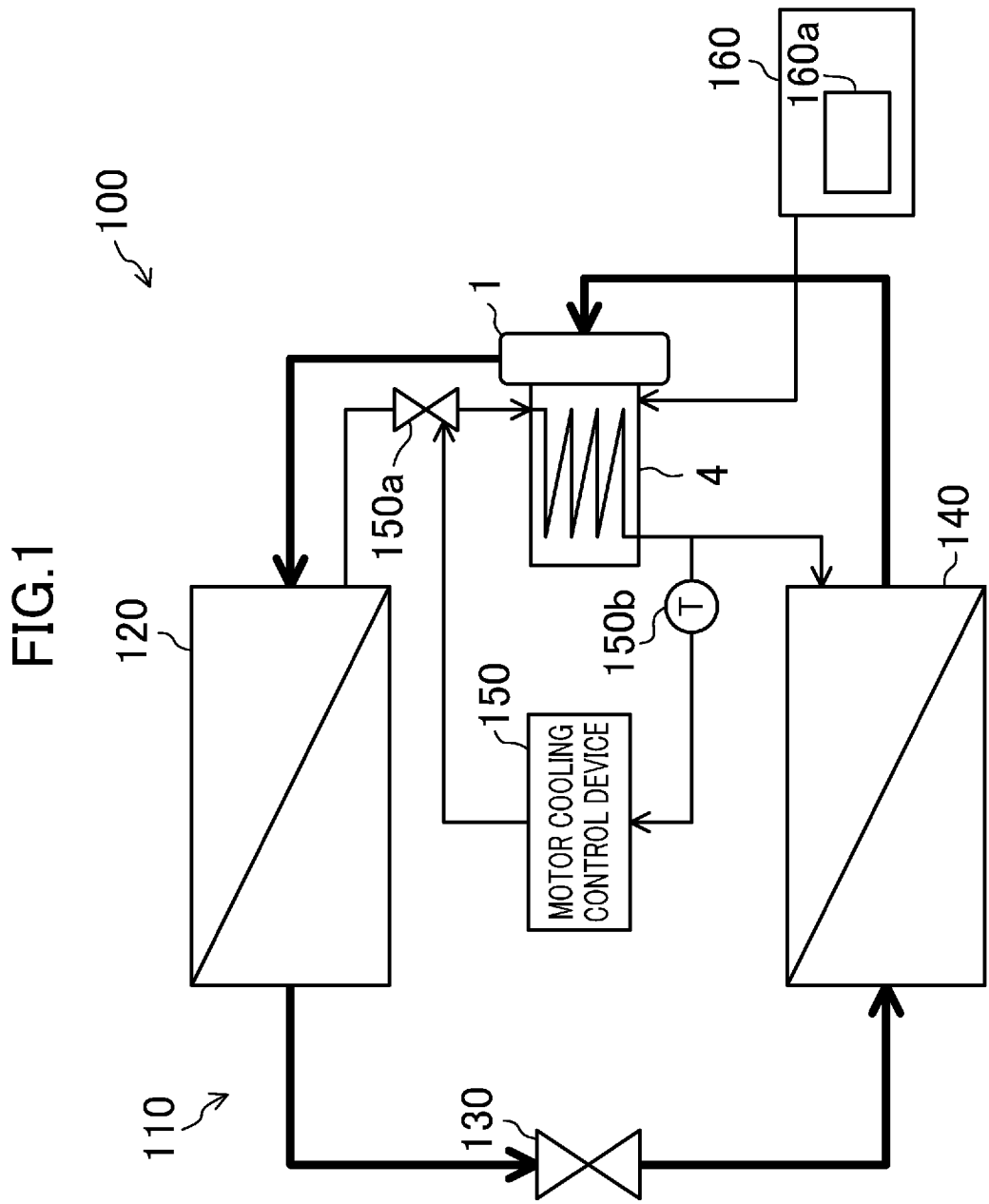
FIG. 1 is a diagram of a pipe system of an air conditioner according to an embodiment of the present invention.

FIG. 1 is a diagram of a pipe system of an air conditioner (100) according to an embodiment of the present invention. As illustrated in FIG. 1, the air conditioner (100) includes a refrigerant circuit (110). The refrigerant circuit (110) is a closed circuit filled with refrigerant, and includes a compressor (1), a condenser (120), an expansion valve (130), an evaporator (140), and a motor cooling control device (150). Various types of compressors can be used as the compressor (1). In this example, the compressor (1) is a turbo compressor and its configuration will be described in detail below. The compressor (1) is driven by an electric motor (4), and the electric motor (4) is supplied with power by an electric motor control device (160).

The condenser (120) and the evaporator (140) can be, for example, cross-fin type heat exchangers. The expansion valve (130) is, for example, an electronic expansion valve. The refrigerant circuit (110) includes a sensor for detecting a refrigerant pressure and a sensor for detecting a refrigerant temperature, which are not illustrated.

<Compressors>

Figure 2:
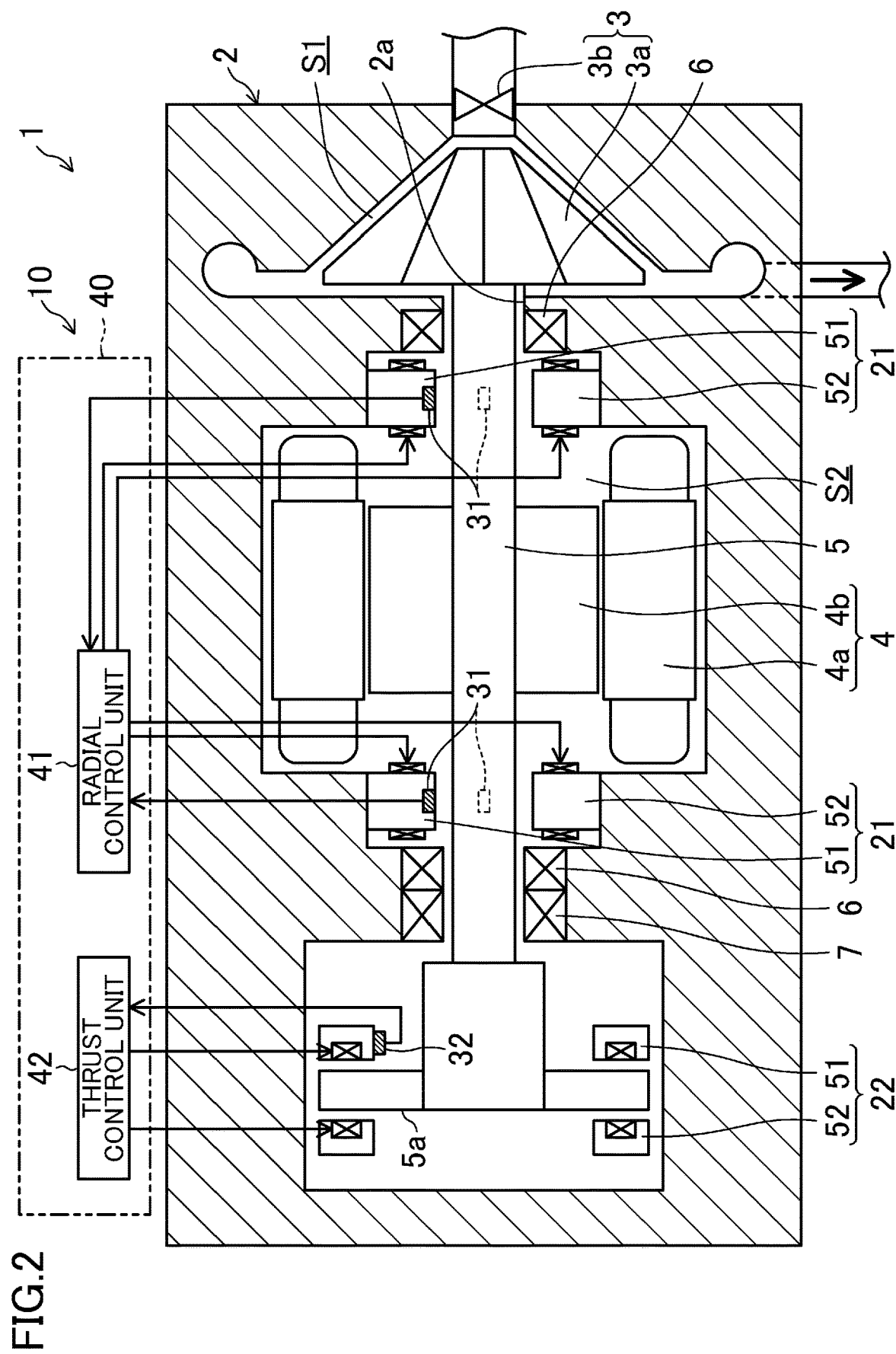
FIG. 2 is a diagram illustrating an exemplary configuration for a compressor according to a first embodiment of the present invention.

FIG. 2 is a diagram illustrating an exemplary configuration for a compressor (1) according to a first embodiment of the present invention. The compressor (1) is what is called a turbo compressor and an example of the fluid machine system according to the present invention. As illustrated in FIG. 2, the compressor (1) includes a casing (2), a compression mechanism (3), the electric motor (4), a shaft (5), radial touchdown bearings (6), a thrust touchdown bearing (7), and a magnetic bearing device (10).

—Casing—

The casing (2) has a cylindrical shape with opposite closed ends, and is disposed with its axis horizontal. The space inside the casing (2) is divided by a wall portion (2a). The space on the right side of the wall portion (2a) is a compression mechanism chamber (S1) for accommodating the compression mechanism (3), and the space on the left side of the wall portion (2a) is an electric motor chamber (S2) for accommodating the electric motor (4). The shaft (5) extending in the axial direction of the casing (2) connects the compression mechanism (3) with the electric motor (4).

—Compression Mechanism—

The compression mechanism (3) is configured to compress fluid (refrigerant in this example). The compression mechanism (3) is an example of a fluid machine according to the present invention. In the present example, the compression mechanism (3) includes an impeller (3a) and inlet guide vanes (3b). The impeller (3a) has a substantially cone outer shape including a plurality of blades, and is fixed to an end of the shaft (5). The inlet guide vanes (3b) are disposed at a fluid (refrigerant) inlet and functions as a valve for controlling the intake rate.

—Electric Motor—

The electric motor (4) is configured to rotationally drive the shaft (5). In this example, the electric motor (4) includes a stator (4a) and a rotor (4b). The stator (4a) has a cylindrical shape and is fixed inside the casing (2). The rotor (4b) has a columnar shape, and is rotatably disposed inside the stator (4a), i.e., in the inner periphery of the stator (4a). The rotor (4b) has an axial hole at the center portion, and the shaft (5) is fixed to the axial hole.

—Electric Motor Control Device—

The electric motor control device (160) controls the power supplied to the electric motor (4) to control the start and stop operations of the electric motor (4) and its rotational speed. In this example, the electric motor control device (160) includes a converter circuit, an inverter circuit, and a microcomputer, which are not illustrated, and these components are mounted on a board, which is hereinafter referred to as a control board (160a). The microcomputer controls switching operation of switching elements included in the inverter circuit. To control the switching operation, the microcomputer receives information on rotational speed of the electric motor (4) and a current value of the electric motor (4). In other words, the air conditioner (100) can acquire the rotational speed of the electric motor (4) and the current value of the electric motor (4) via the microcomputer. The control board (160a) includes a temperature sensor (not illustrated) to protect, for example, the switching elements, and the microcomputer utilizes the detection value of the temperature sensor to control the inverter circuit. This configuration allows the air conditioner (100) to acquire temperature information detected in the control board (160a) via the microcomputer.

—Electric Motor Cooling Control Device—

In the compressor (1), allowing part of the refrigerant inside the condenser (120) to flow into the electric motor (4) cools the electric motor (4). In this example, the electric motor (4) is connected to the condenser (120) by a pipe via an electric on-off valve (150a). The electric motor (4) is also connected to the evaporator (140) by a pipe (hereinafter referred to as a return pipe) through which refrigerant that has passed through and cooled the electric motor (4) is returned to the evaporator (140). On the way to the return pipe, a temperature sensor (150b) is provided. The electric motor cooling control device (150) controls the on-off valve (150a) in accordance with the detection value of the temperature sensor (150b) to control the flow rate of the refrigerant flowing in the electric motor (4). This configuration allows the electric motor (4) to keep its temperature within a predetermined temperature range in the refrigerant circuit (110).

—Touchdown Bearings—

The compressor (1) includes two types of touchdown bearings, namely, the radial touchdown bearings (6) and the thrust touchdown bearing (7). The radial touchdown bearings (6) and the thrust touchdown bearing (7) are configured to support the shaft (5) when the magnetic bearing device (10) is not energized, in other words, when the shaft (5) is not levitated.

—Magnetic Bearing Device—

The magnetic bearing device (10) includes one or more (in this example, three) magnetic bearings, one or more (in this example, five) displacement sensors (31, 32), and a controller (40). The magnetic bearings included in the magnetic bearing device (10) include a pair of electromagnets facing each other across a supported member, such as a supported portion of the shaft (5), and applies composite electromagnetic force (F) of the pair of electromagnets to support the supported member without any physical contact. Controlling a pair of currents flowing in the pair of electromagnets controls the composite electromagnetic force (F) of the pair of electromagnets, which in turn allows the magnetic bearing to control the position of the supported member in the facing direction of the pair of electromagnets. In this example, the magnetic bearing device (10) includes two radial magnetic bearings (21) and one thrust magnetic bearing (22) as the magnetic bearings described above.

—Radial Magnetic Bearing—

Figure 3:
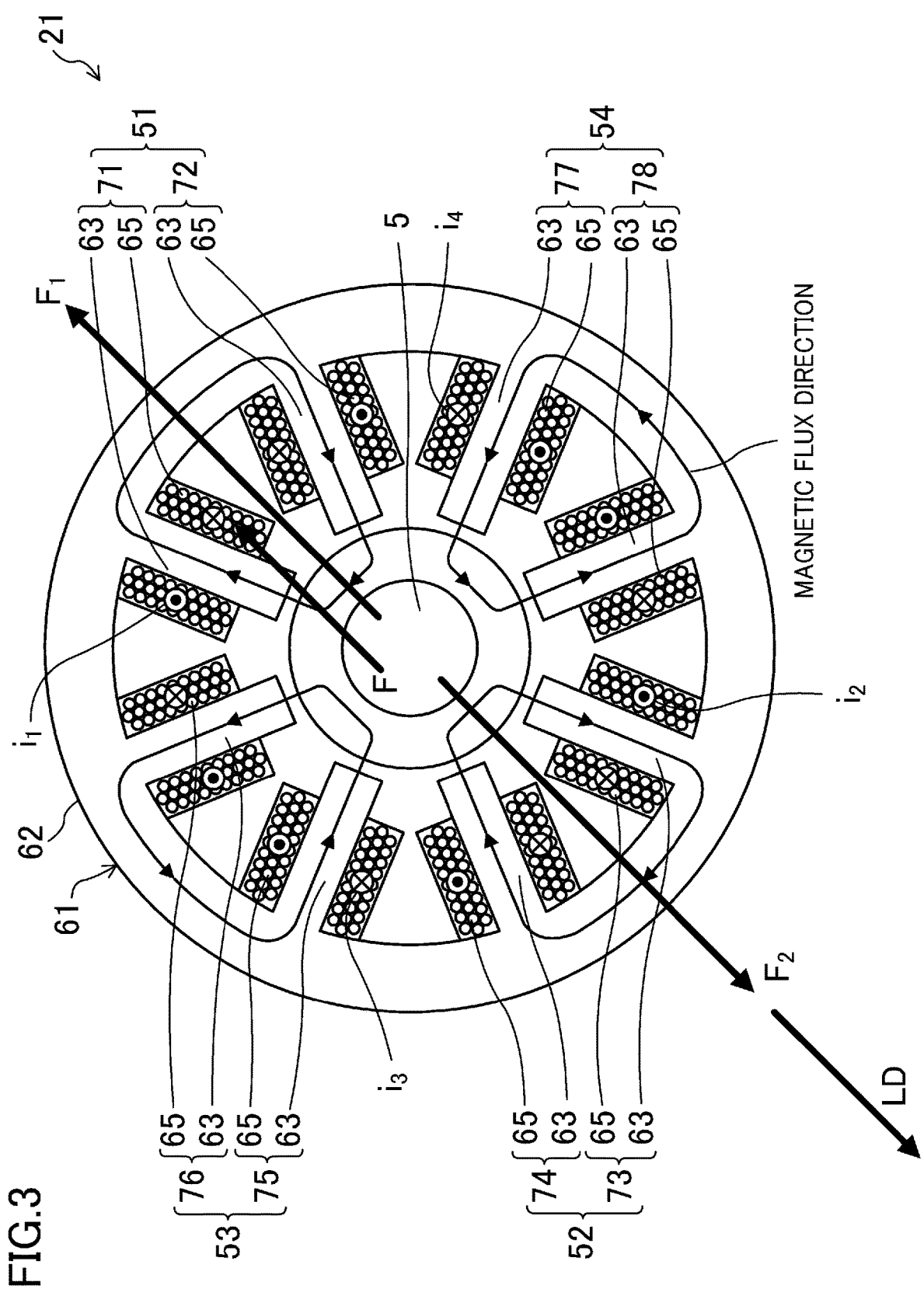
FIG. 3 is a cross-sectional view illustrating an exemplary configuration for a radial magnetic bearing.
Figure 4:
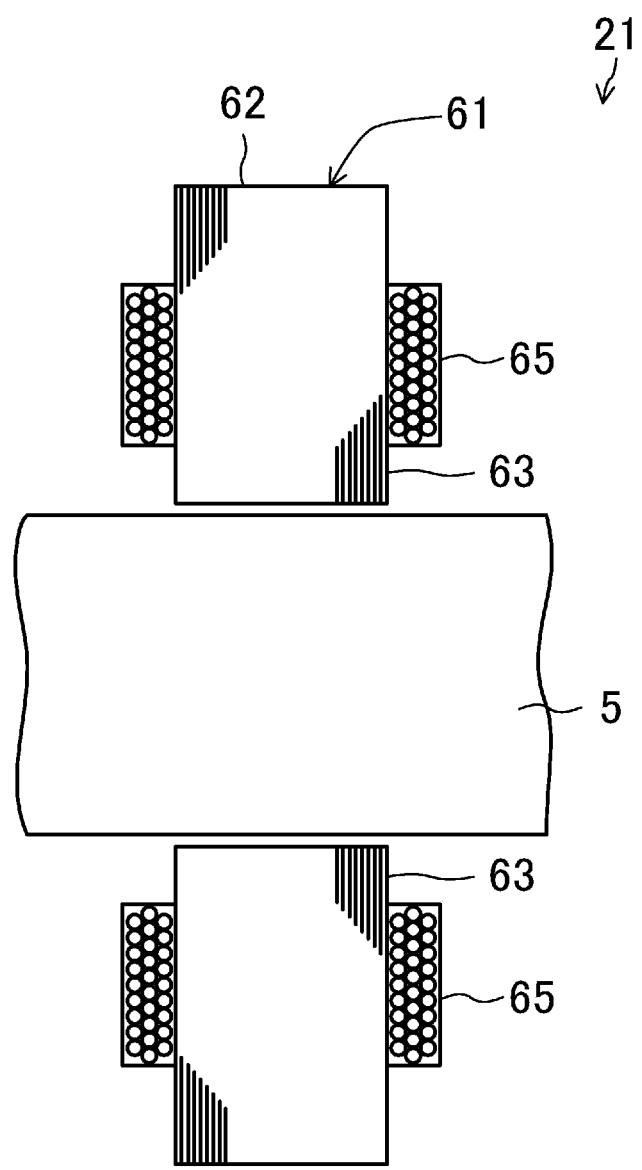
FIG. 4 is a vertical cross-sectional view illustrating an exemplary configuration for the radial magnetic bearing.

FIG. 3 is a cross-sectional view illustrating an exemplary configuration for a radial magnetic bearing (21). FIG. 4 is a longitudinal section view illustrating an exemplary configuration for the radial magnetic bearing (21). As illustrated in FIGS. 3 and 4, the radial magnetic bearing (21) includes first to fourth electromagnets (51 to 54) and is a heteropolar radial magnetic bearing. The first and second electromagnets (51, 52) face each other across the supported portion (axial member) of the shaft (5) and apply the composite electromagnetic force (F) of the first and second electromagnets (51, 52) to support the supported portion of the shaft (5) without any physical contact. The third and fourth electromagnets (53, 54) face each other across the supported portion (axial member) of the shaft (5) and apply the composite electromagnetic force (F) of the third and fourth electromagnets (53, 54) to support the supported portion of the shaft (5) without any physical contact. The facing direction of the third and fourth electromagnets (53, 54) (the direction corresponding to a downward direction toward the right in FIG. 3) is perpendicular to the facing direction of the first and second electromagnets (51, 52) (the direction corresponding to an upward direction toward the right in FIG. 3), when viewed in plan.

In this example, the radial magnetic bearing (21) includes a magnetic bearing core (61) and eight coils (65). The magnetic bearing core (61) is, for example, a stack of a plurality of electromagnetic steel sheets, and has a back yoke (62) and eight teeth (63). The back yoke (62) is cylindrically shaped. The eight teeth (63) are regularly angularly spaced (at 45 degrees in this example) in the circumferential direction along the inner circumferential surface of the back yoke (62), and protrude radially inward from the inner circumferential surface of the back yoke (62). The innermost surfaces (tip surfaces) of the eight teeth (63) face the outer circumferential surface of the supported portion of the shaft (5) with a predetermined gap therebetween.

The eight coils (65) are respectively wound around the eight teeth (63) of the magnetic bearing core (61). This configuration in this example forms eight electromagnet units (first to eighth electromagnet units (71 to 78)). Specifically, the first electromagnet unit (71), the second electromagnet unit (72), the seventh electromagnet unit (77), the eighth electromagnet unit (78), the third electromagnet unit (73), the fourth electromagnet unit (74), the fifth electromagnet unit (75), and the sixth electromagnet unit (76) are arranged in this order clockwise in FIG. 3.

The winding direction of the coils (65) and the direction of the current flowing in the coils (65) are set such that the first to fourth electromagnets (51 to 54) generate attraction force, that is, generate electromagnetic force exerted to attract the supported portion (axial member) of the shaft (5). Specifically, the winding direction of the coils (65) and the direction of the current flowing in the coils (65) are set to generate magnetic flux in the directions indicated by arrows in FIG. 3.

—Thrust Magnetic Bearing—

Figure 5:
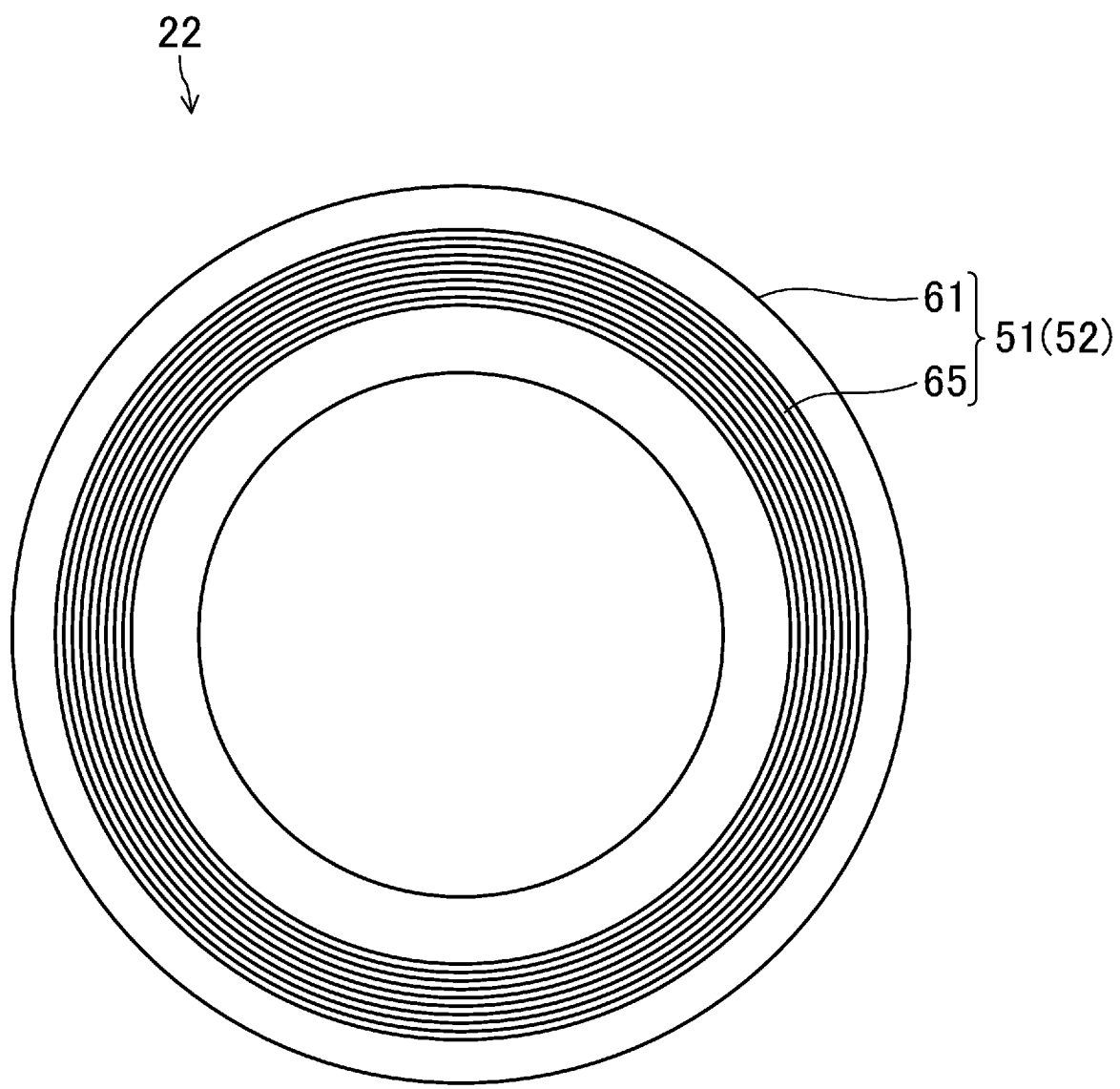
FIG. 5 is a plan view illustrating an exemplary configuration for a thrust magnetic bearing.
Figure 6:
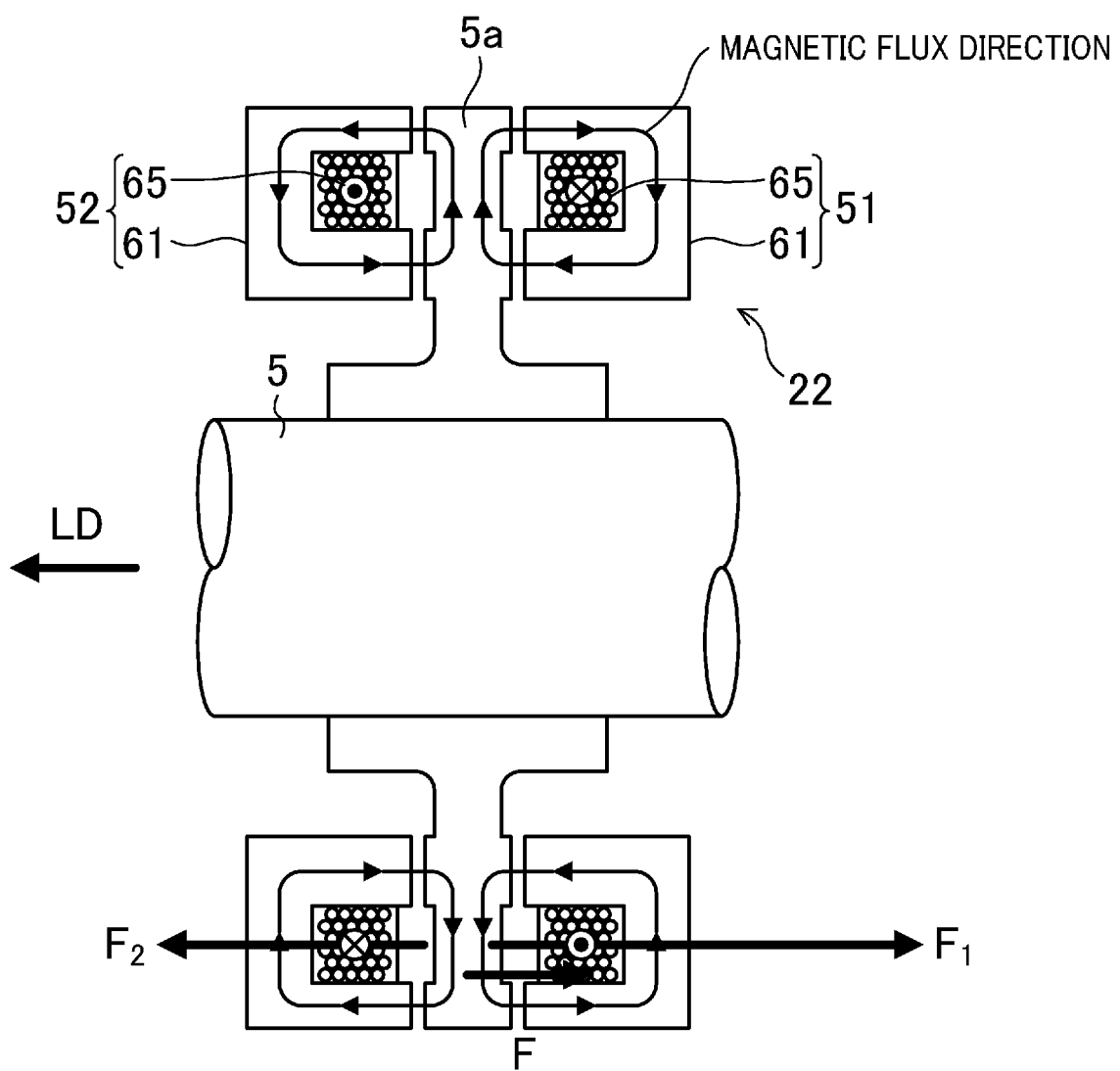
FIG. 6 is a vertical cross-sectional view illustrating an exemplary configuration for the thrust magnetic bearing.

FIG. 5 is a plan view illustrating an exemplary configuration for the thrust magnetic bearing (22). FIG. 6 is a longitudinal section view illustrating an exemplary configuration for the thrust magnetic bearing (22). As illustrated in FIGS. 5 and 6, the thrust magnetic bearing (22) includes first and second electromagnets (51, 52). The shaft (5) has a disk-shaped portion, which is hereinafter referred to as a disk portion (5a), at the other end opposite to the end to which the impeller (3a) is fixed. The first and second electromagnets (51, 52) face each other across the disk portion (5a) that is a supported portion of the shaft (5), and apply composite electromagnetic force (F) of the first and second electromagnets (51, 52) to support the supported portion of the shaft (5), which is the disk portion (5a), without any physical contact.

Specifically, the thrust magnetic bearing (22) in this example includes two magnetic bearing cores (61) and two coils (65). The two magnetic bearing cores (61) each have an annular shape and are disposed at opposite sides of the supported portion of the shaft (5), or the disk portion (5a), in the axial direction with a predetermined gap from the supported portion. The facing surfaces of the magnetic bearing cores (61) each have a circular groove along the entire circumference. The two coils (65) are accommodated in the respective circular grooves of the two magnetic bearing cores (61). This configuration in this example forms two electromagnets (the first and second electromagnets (51, 52)). Controlling the current flowing in the first and second electromagnets (51, 52) controls the composite electromagnetic force (F) of the first and second electromagnets (51, 52). This can in turn control the position of the supported portion of the shaft (5), or the disk portion (5a), in the facing direction of the first and second electromagnets (51, 52) (that is, in the axial direction, in the horizontal direction in FIG. 6).

The winding direction of the coils (65) and the direction of the current flowing in the coils (65) are set such that the first and second electromagnets (51, 52) generate attraction force, that is, generate electromagnetic force exerted to attract the supported portion of the shaft (5), or the disk portion (5a). Specifically, the winding direction of the coils (65) and the direction of the current flowing in the coils (65) are set to generate magnetic flux in the directions indicated by arrows in FIG. 6.

—Displacement Sensor—

As illustrated in FIG. 2, the compressor (1) includes two types of displacement sensors, namely, radial displacement sensors (31) and a thrust displacement sensor (32). In this example, the radial displacement sensors (31) and the thrust displacement sensor (32) are eddy current displacement sensors. These displacement sensors (31, 32) are provided for a pair of electromagnets, such as the first and second electromagnets (51, 52), facing each other across the supported member, or the supported portion of the shaft (5), in this example. The displacement sensors (31, 32) are configured to detect a displacement ($\delta$) of the supported member relative to the center position in the facing direction of each pair of electromagnets. The center position is a reference position of displacement and, for example, a center position between the first electromagnet (51) and the second electromagnet (52).

—Radial Displacement Sensor (31)—

In this example, two radial displacement sensors (31) are provided for each radial magnetic bearing (21). In other words, the compressor (1) includes four radial displacement sensors (31). These radial displacement sensors (31) are configured to detect displacements ($\delta$) of the supported portion of the shaft (5) relative to the center position. In each radial magnetic bearing (21), one of the two radial displacement sensors (31) detects a displacement ($\delta$) in the facing direction (hereinafter referred to as an X direction) of the first electromagnet (51) and the second electromagnet (52). The X direction corresponds to a radial direction of the radial magnetic bearing (21). In FIG. 3, the X direction corresponds to the upward direction toward the right. The other one of the two radial displacement sensors (31) detects a displacement ($\delta$) in the facing direction of the third electromagnet (53) and the fourth electromagnet (54), that is, a radial direction orthogonal to the X direction, or hereinafter referred to as a Y direction. In FIG. 3, the Y direction corresponds to the downward direction toward the right.

—Thrust Displacement Sensor (32)—

The compressor (1) includes only one thrust displacement sensor (32). The thrust displacement sensor (32) is configured to detect a displacement ($\delta$) in the facing direction of the first electromagnet (51) and the second electromagnet (52) of the thrust magnetic bearing (22), that is, in the axial direction of the shaft (5), or hereinafter referred to as a Z direction. In FIG. 6, the Z direction corresponds to the horizontal direction. Specifically, the thrust displacement sensor (32) detects the displacement ($\delta$) of the supported portion of the shaft (5), or the disk portion (5a), relative to the center position.

<Controller>

The controller (40) controls one or more magnetic bearings (21, 22) to support the supported member, or the supported portion of the shaft (5) in this example, without any physical contact. Specifically, the controller (40) controls the electromagnetic force of the magnetic bearings (21, 22) to control levitation of the shaft (5). In this example, the controller (40) includes a radial control unit (41) configured to control the two radial magnetic bearings (21) and a thrust control unit (42) configured to control the thrust magnetic bearing (22). Specifically, the controller (40) can be configured by, for example, a microcomputer and a memory device storing software for operating the microcomputer.

—Radial Control Unit (41)—

The radial control unit (41) controls the levitation of the shaft (5) by controlling the position of the shaft (5) in the X direction and the Y direction. Specifically, the radial control unit (41) controls the levitation by controlling a current, or a control current (id), flowing in the coils (65) of the first to fourth electromagnets (51 to 54) to bring a differential value (e) to zero between the displacement ($\delta$) of the shaft (5) and a predetermined position instruction value ($\delta^*$) in the X direction and the Y direction.

In controlling the levitation, the radial control unit (41) may use the output signal of the radial displacement sensors (31) as it is as a displacement ($\delta$) of the shaft (5), but the output signal of the radial displacement sensors (31) may include what is called the drift. The drift in this description indicates a change in levels of the output signal of the radial displacement sensors (31) that occurs in accordance with a change in ambient temperature around the radial displacement sensors (31). When such drift occurs in the radial displacement sensors (31), the radial control unit (41) controls the levitation based on a displacement ($\delta$) including errors, thereby failing to correctly control the levitation. To prevent this situation, the radial control unit (41) compensates for the change in levels of the output signal of the radial displacement sensors (31), and controls the position of the shaft (5) based on the compensated output signals for this change. The compensation for the change in levels of the output signal will be described later in detail.

—Thrust Control Unit (42)—

The thrust control unit (42) controls the position of the shaft (5) in the Z direction. Specifically, the thrust control unit (42) controls the levitation by controlling a current, or a control current (id), flowing in the coils (65) of the first and second electromagnets (51, 52) to bring a differential value (e) to zero between the displacement ($\delta$) of the disk portion (5a) and a predetermined position instruction value ($\delta^*$) in the Z direction.

In controlling the levitation, the thrust control unit (42) may use the output signal of the thrust displacement sensor (32) as it is as a displacement ($\delta$) of the disk portion (5a), but the output signal of the thrust displacement sensor (32) may include the drift. When such drift occurs in the thrust displacement sensor (32), the thrust control unit (42) controls the levitation based on a displacement ($\delta$) including errors, thereby failing to correctly control the levitation. To prevent this situation, the thrust control unit (42) compensates for the change in levels of the output signal of the thrust displacement sensor (32), and controls the position of the disk portion (5a), or the position of the shaft (5) based on the compensated output signal for this change. The compensation for the change in levels of the output signal will be described later in detail.

<Compensation for Output Signal>

—Concept of Compensation—

Figure 7:
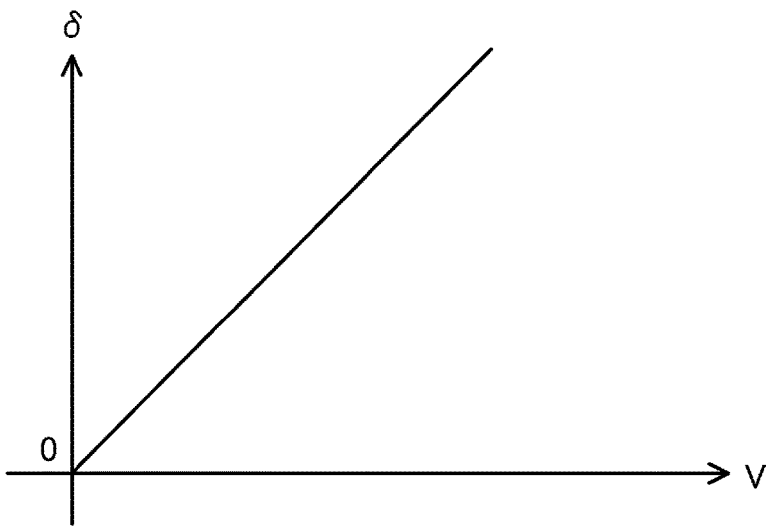
FIG. 7 is a graph illustrating an example relation between a displacement of a shaft and an output voltage of a displacement sensor.
Figure 8:
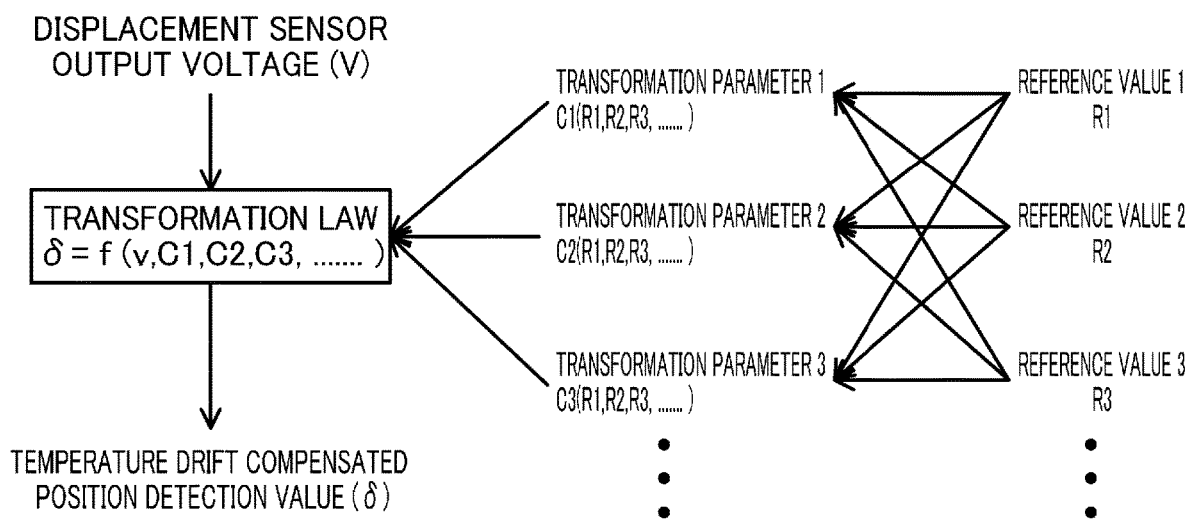
FIG. 8 is a diagram illustrating a concept of a compensation scheme for an output signal, the compensation being performed by a radial control unit and a thrust control unit.

FIG. 7 is a graph illustrating a relation between the displacement ($\delta$) of the shaft (5) and the output voltage (V) from the displacement sensors (31, 32), and this relation is hereinafter referred to as voltage characteristics. The voltage characteristics can be described as a linear graph as illustrated in FIG. 7 or a curved graph. The linear or curved graph illustrating voltage characteristics is hereinafter referred to as a voltage characteristics curve. FIG. 8 is a diagram illustrating a concept of a compensation scheme for an output signal performed by the radial control unit (41) and the thrust control unit (42). As illustrated in FIG. 8, the control units (41, 42) transform the output signal by using a transformation law represented by one or more transformation parameters (C) to compensate for a change in levels of the output signal. The transformation law is a rule for transforming an output voltage (V) into a displacement ($\delta$). The voltage characteristics curve is represented by a function including one or more transformation parameters (C) as coefficients, and the control units (41, 42) transform the output signal, or the output voltage (V), of the displacement sensors (31, 32) into a displacement (δ) by using the function.

Typically, the voltage characteristics curve of the displacement sensors (31, 32) varies in accordance with the ambient temperature around the displacement sensors (31, 32). In other words, the outputs of the displacement sensors (31, 32) depend on the temperature. Suppose that, for example, the voltage characteristics curve is represented as a line of a linear function. In this case, preparing a slope and an intercept of the line representing a function of temperature as the transformation parameters (C) allows for obtaining a correct displacement (δ) from the temperature-dependent outputs of the displacement sensors (31, 32).

To achieve this configuration, the control units (41, 42) according to the first embodiment obtain transformation parameters (C) by using reference values (R) that are obtainable in the air conditioner (100). The reference values (R) are detection values for use in controlling the electric motor (4), the compressor (1) including the electric motor (4), or the air conditioner (100) including the compressor (1). The reference values (R) correlate with the change in levels of the output signals from the displacement sensors (31, 32), the change occurring in accordance with the change in ambient temperature around the displacement sensors (31, 32). Examples of reference values (R) may include a temperature, a pressure, and a voltage detected in a device including the magnetic bearings (21, 22), and details thereof will be described later. In some embodiments, each transformation parameter (C) is obtained from a single reference value (R) or calculated by using two or more reference values (R). For example, a temperature may be calculated from a combination of a flow rate (volume) and a pressure of refrigerant.

In the first embodiment, the radial control unit (41) and the thrust control unit (42) each compensate for a change in levels of the output signal based on the concept above. The following describes a compensation scheme for the output signal performed by, for example, the radial control unit (41).

—Compensation by Radial Control Unit (41)—

Figure 9:
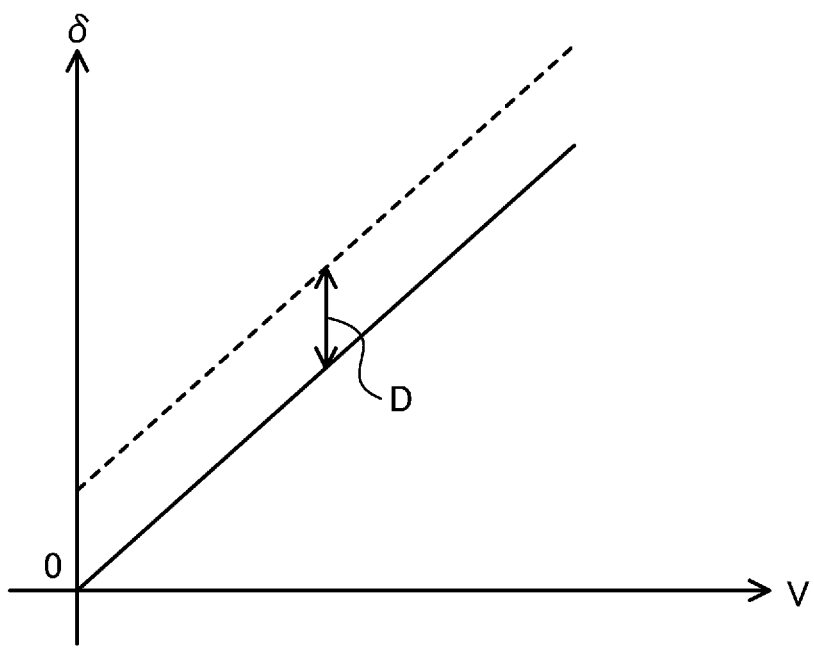
FIG. 9 is a graph illustrating drift in a radial displacement sensor.

FIG. 9 is a graph illustrating the drift in a radial displacement sensor (31). The voltage characteristics of the radial displacement sensor (31) can be represented by a linear graph. The intercept of the linear graph varies in accordance with the ambient temperature around the radial displacement sensor (31), whereas the slope of the linear graph does not change. For ease of discussion, the amount of change in the intercept is referred to as a drift amount (D).

Figure 10:
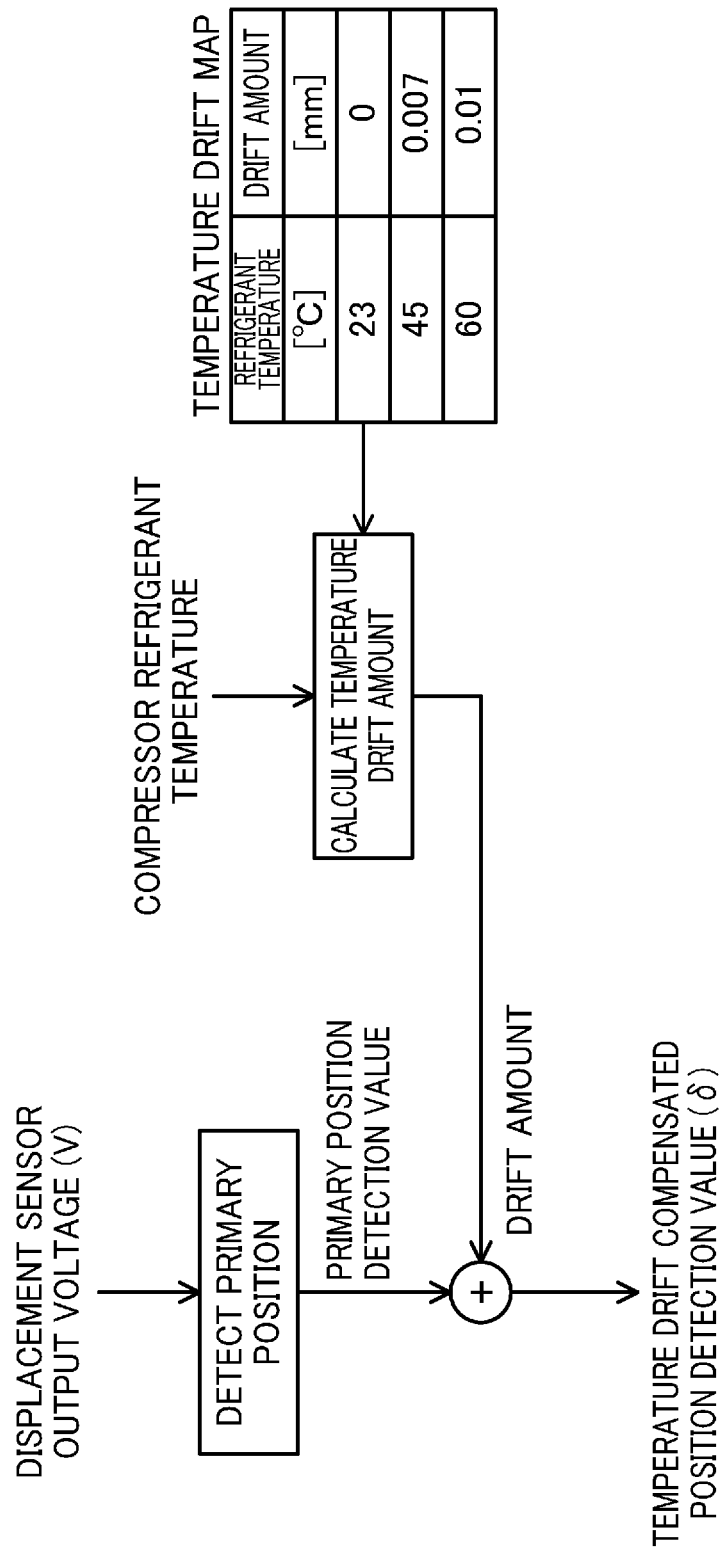
FIG. 10 is a block diagram illustrating a compensation scheme for an output signal, the compensation being performed by the radial control unit.

FIG. 10 is a block diagram illustrating a compensation scheme for the output signal performed by the radial control unit (41). The radial control unit (41) stores therein a transformation table (described as temperature drift map in FIG. 10) containing a plurality of pairs of a reference value (R) and a transformation parameter (C).

Examples of the reference value (R) may include a "refrigerant temperature". Typically, the "refrigerant temperature" is important information for controlling the air conditioner (100), and the refrigerant circuit (110) includes a temperature sensor for detecting the "refrigerant temperature". In the first embodiment, for example, the temperature sensor (150b) configured to detect the temperature of the refrigerant for use in cooling the electric motor (4) can be used. When the electric motor (4) of the compressor (1) rotates at a relatively high rotational speed, the temperature of the shaft (5) increases and the temperature of the radial displacement sensor (31) is highly likely to increase. When the electric motor (4) rotates at a relatively high rotational speed, the temperature of the refrigerant for use in cooling the electric motor (4) increases, and as a result, the temperature sensor (150b) is highly likely to output a higher detection value. In other words, the voltage value output from the temperature sensor (150b) correlates with the drift amount (D) of the radial displacement sensor (31). The radial control unit (41) stores a transformation table containing a plurality of pairs of a detection value of the temperature sensor (150b) and a drift amount (D) corresponding to the detection value in the memory device. In FIG. 10, for example, the difference between the intercept of the base reference value (R) and the intercept of a reference value (R) to be included in the table is referred to as a drift amount (D). Within an assumable range of ambient temperatures, a predetermined number of pairs of a reference value (R) to be included in the table and a drift amount (D) are stored in the memory device of the controller (40). In FIG. 10, for example, the drift amount (D) at a reference value (R) of 23° C. is determined to be a base value (0 mm).

While the radial magnetic bearings (21) are operating, the radial control unit (41) performs the compensation scheme described above upon detection of the output voltage (V) of the radial displacement sensors (31). Specifically, the radial control unit (41) refers to the transformation table, and obtains the drift amount (D) corresponding to a reference value (R), that is, a detection value of the temperature sensor (150b). If a detection value of the temperature sensor (150b) is not included in the transformation table, the drift amount (D) corresponding to the detection value may be obtained by, for example, interpolation using values in the transformation table. In other words, the radial control unit (41) obtains a drift amount (D) from the transformation table to correct the parameter for use in the transformation law.

Once obtaining a drift amount (D), the radial control unit (41) can obtain the displacement (δ) corresponding to the current situation of the radial displacement sensor (31), since the voltage characteristics curve (hereinafter referred to as a base characteristics curve) of the radial displacement sensor (31) at the base temperature is known. As illustrated in FIG. 9, the current voltage characteristics deviate from the base characteristics curve with respect to the intercept. The radial control unit (41) calculates a displacement (δ) on the base characteristics curve, which is described as a primary position detection value in FIG. 10, and adds the drift amount (D) to the calculation value. Since each radial magnetic bearing (21) has two radial displacement sensors (31), the radial control unit (41) compensates for the output signal of each radial displacement sensor (31). In this regard, the radial control unit (41) can obtain compensated displacements (δ) for the effects of temperature with respect to the X direction and the Y direction.

If the slope of the line representing the voltage characteristics is dependent on the ambient temperature, the transformation table includes sets of three pieces of data that are an ambient temperature, an amount of change in the intercept corresponding to the ambient temperature, and an amount of change in the slope corresponding to the ambient temperature.

In some embodiments, two radial displacement sensors (31) share one transformation table, or each radial displacement sensor (31) refers to a different transformation table.

Advantages of First Embodiment

As can be seen, the first embodiment above can obtain the following advantages. Specifically, the magnetic bearing device according to this embodiment can compensate for a change in levels of an output signal of a displacement sensor, which is referred to as drift in the example above, the change occurring in accordance with a change in temperature of the displacement sensor or a change in ambient temperature around the displacement sensor, without providing a temperature sensor near the displacement sensor.

The refrigerant temperature available for use in correcting parameters in the transformation law is not limited to the temperature of the refrigerant according to the electric motor cooling control device (150).

Second Embodiment

A second embodiment according to the present invention describes an example of using a transformation parameter (C) having discrete values. In the second embodiment, an index value indicating whether the operating state of the air conditioner (100) has stabilized is used as a transformation parameter (C). This index value is hereinafter referred to as a stabilization index.

Figure 11:
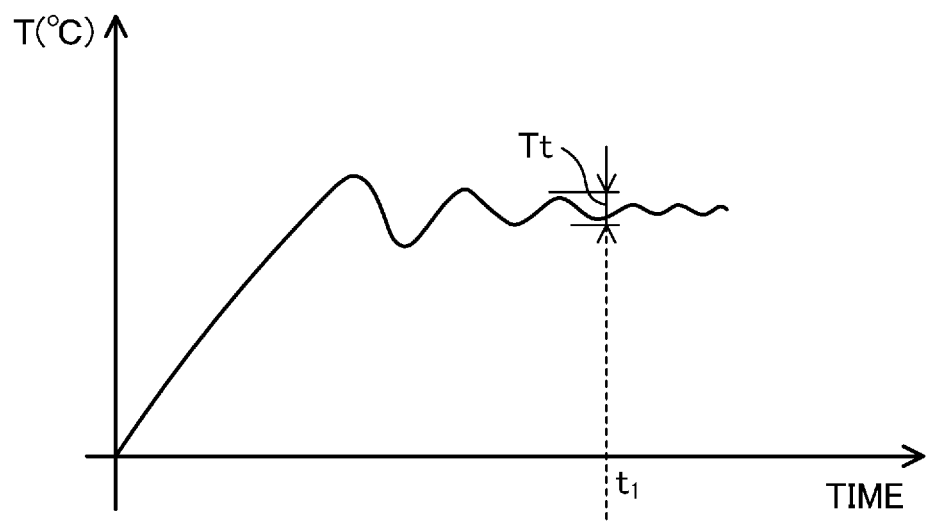
FIG. 11 is a timing chart illustrating an output of a stabilization index based on a temperature sensor.
Figure 11:
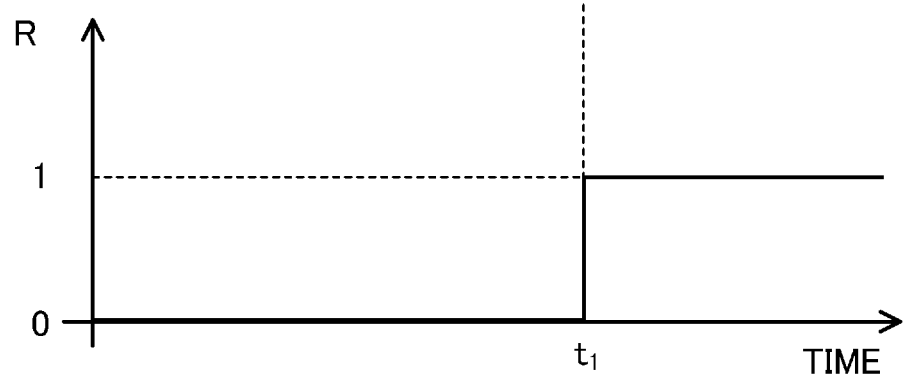

FIG. 11 is a timing chart illustrating an output of the stabilization index based on the temperature sensor (150b). FIG. 11 illustrates the output (T) of the temperature sensor (150b) from the beginning of the operation of the air conditioner (100). In the second embodiment, while the fluctuations of the output (T) of the temperature sensor (150b) are equal to or larger than a predetermined threshold (Tt), the stabilization index is 0, and when the fluctuations are smaller than the threshold (Tt), the stabilization index becomes 1. In FIG. 11, for example, the fluctuations are smaller than the threshold (Tt) at and after time (t) of t1. The control units (41, 42) according to the second embodiment use a transformation law including this stabilization index as a transformation parameter (C). The control units (41, 42) are configured to correct parameters used in the transformation law in accordance with the stabilization index.

For example, before the operating state of the air conditioner (100) stabilizes, the ambient temperature around the displacement sensors (31, 32) stays at relatively low temperatures. When the operating state stabilizes, the ambient temperate is likely to stay at relatively high temperatures. In such a case, the control units (41, 42) correct the parameters used in the transformation law in accordance with the stabilization index (in this case, in accordance with weather the stabilization index is 0 or 1), thereby allowing the control units (41, 42) to obtain a compensated displacement (δ) for the effects of temperature. In this regard, in the second embodiment, the magnetic bearing device can compensate for a change in levels of an output signal of a displacement sensor, the change occurring in accordance with a change in temperature of the displacement sensor and a change in ambient temperature around the displacement sensor, without providing a temperature sensor near the displacement sensor.

Other Embodiments

In some embodiments, the compensation scheme for the output signal of the displacement sensors described in the first and second embodiments is applicable to a device including only the thrust magnetic bearing or the radial magnetic bearing. If the device includes both thrust magnetic bearing and radial magnetic bearing, the compensation scheme may be applied only to the thrust magnetic bearing or the radial magnetic bearing.

In some embodiments, the compensation scheme for the output signal of the displacement sensors described in the first and second embodiments is used for controlling the magnetic bearings of a generator of, for example, the hydraulic power generation or wind power generation, or the magnetic bearings of pumps in addition to the magnetic bearings of compressors.

When a transformation law for transforming an output voltage (V) into a displacement (δ) includes another law (sub transformation law) to obtain a new parameter, the control units may switch sub transformation laws to be used in the transformation law in accordance with the reference value (R). Examples of switching sub transformation laws include switching sub transformation law expressions y(x) for use in a transformation law z(x) in accordance with an x value that is a reference value (R).

—Example of Switching Sub Transformation Laws—
Transformation law: $z(x)=2y(x)$
$y(x)=ax+b$ (when $x>R0$)
$y(x)=ax^2$ (when $x \leq R0$)
R0 is a threshold and a and b are constants.

The phrase "correct the one or more parameters in accordance with the one or more reference values (R)" claimed in the present invention includes a concept of obtaining a new parameter by switching sub transformation laws.

Various types of detection values can be used for the reference values (R). Examples of detection values include the following. Transformation parameters (C) may, of course, be obtained by combining some of these reference values (R).

(1) Rotational Speed of Rotary Electric Machine (Motor)

In some cases, the ambient temperature around the displacement sensors (31, 32) increases when the rotational speed of the rotary electric machine such as the electric motor (4) is increased, and the ambient temperature drops when the rotational speed is reduced. In such a case, parameters for use in the transformation law can be corrected in accordance with the rotational speed of the rotary electric machine.

(2) Current of Rotary Electric Machine

In some cases, the ambient temperature around the displacement sensors (31, 32) increases when the current flowing in the rotary electric machine is increased, and the ambient temperature drops when the current is reduced. In such a case, parameters for use in the transformation law can be corrected in accordance with the current flowing in the rotary electric machine.

(3) Pressure and Flow Rate of Refrigerant

In the air conditioner (100), the refrigerant pressure varies in accordance with the operating state. In a typical configuration, the air conditioner (100) includes a sensor for detecting the refrigerant pressure. In this regard, when the detection value of the pressure sensor correlates with the ambient temperature around the displacement sensors (31, 32), the parameters for use in the transformation law can be corrected in accordance with the detection value of the pressure sensor.

In the air conditioner (100), the flow rate of refrigerant can be calculated by using information such as the rotational speed of the compressor (1). In some cases, the flow fate of the refrigerant correlates with the ambient temperature around the displacement sensors (31, 32). In such a case, the parameter for use in the transformation law can be corrected in accordance with the flow rate of the refrigerant.

(4) Temperature of Control Board

The control board (160a) includes a temperature sensor (not illustrated) to protect switching elements and other components. When, for example, the detection value of the temperature sensor correlates with the temperature of switching elements included in an inverter circuit, the detection value is expected to correlate with the ambient temperature around the displacement sensors (31, 32). In this case, the parameters for use in the transformation law can be corrected in accordance with the detection value.

(5) Opening Degree of Inlet Guide Vanes

The opening degree of the inlet guide vanes (3b) is controlled in accordance with, for example, the flow rate of fluid (flow rate of refrigerant in the example above). In other words, the opening degree of the inlet guide vanes (3b) reflects the flow rate of the fluid. When the flow rate of fluid in a device correlates with the ambient temperature around the displacement sensors (31, 32), the parameters for use in the transformation law can be corrected in accordance with the opening degree of the inlet guide vanes (3b).

«Applications of Displacement Sensors»

The configuration that allows for the compensation for the output signals of the radial displacement sensors (31) and the thrust displacement sensor (32) enables more accurate dynamic balancing of the shaft (5).

In a known method for dynamic balancing, what is called an influence coefficient is obtained and then the weight and position of a necessary balancing weight are determined based on the influence coefficient. In a typical dynamic balancing procedure, a trial weight is attached to a correction plane fixed to a dynamic-balancing target rotor, and the rotor is rotated at a certain speed and the vibrations of a measuring plane are measured, and the influence coefficient is calculated based on the measured vibrations. However, a rotary member, such as the shaft (5) above, for a high-speed operation has to be rotated at high speed in calculating the influence coefficient. In addition, attaching the trial weight requires many processes to take. To solve the problems above, the following describes an example method for obtaining the influence coefficient without attaching the trial weight or rotating the shaft (5) at high speed. In the example below, what is called a two-plane balancing scheme is performed for two planes that are orthogonal to the shaft (5). In the two-plane balancing, there are two measuring planes and two correction planes. A radial magnetic bearing has a measuring plane which is a plane orthogonal to the shaft. On the measuring plane, displacement sensors are disposed in the X direction and the Y direction. A correction plane, which is not illustrated in FIG. 2, is a plane orthogonal to the shaft and fixed near the corresponding measuring plane.

<Calculation of Influence Coefficient>

The influence coefficient, denoted by a, can be represented by the following expression, $$\alpha_{ji}(\Omega) = \Omega^2 G_{ji}(\Omega) \qquad \text{Expression (1)}$$

where G is a reciprocal of dynamic stiffness between a magnetic bearing and a supported member (G is hereinafter referred to as a dynamic compliance), and $\Omega$ is a rotational speed of the shaft (5) represented by frequency.

According to expression (1) above, if the dynamic compliance (G) during the operation of the shaft (5) at frequency $\Omega$ is measurable, the influence coefficient ($\alpha$) during the operation can be calculated. A subscript j of the variables indicates a measuring plane. In this example, 1 represents a measuring plane (hereinafter referred to as a first measuring plane) close to the impeller, and 2 represents a measuring plane (hereinafter referred to as a second measuring plane) away from the impeller. A subscript i indicates a correction plane. In this example, 1 represents a correction plane (first correction plane) close to the impeller, and 2 represents a correction plane (second correction plane) away from the impeller. For example, $G_{11}(\Omega)$ indicates a dynamic compliance (G) between the first correction plane and the first measuring plane during operation of the shaft (5) at frequency $\Omega$.

In the present embodiment, the electromagnets (51 to 54) excite the shaft (5) with the electromagnetic force, and the displacements ($\delta$) detected by the radial displacement sensors (31) are sampled. As a result, a dynamic compliance (G), or a pseudo dynamic compliance (G'), from the electromagnets to the measuring plane is calculated. An electromagnet plane, which is orthogonal to the shaft and in which the electromagnets are disposed, and the correction plane are disposed at different positions in the axial direction, and thus the pseudo dynamic compliance (G') is different from the dynamic compliance (G), but they are interchangeable with a simple method. In the present embodiment, the excitation of the shaft is controlled by the radial control unit (41) having a control system for the electromagnets (51 to 54).

Specifically, the radial control unit (41) first levitates the shaft (5) and keeps it stationary, and then causes one of the radial magnetic bearings (21) to excite the shaft (5) at an excitation force of frequency $\Omega$. In this example, the radial control unit (41) first causes a first radial magnetic bearing (21) to excite the shaft (5) in the X direction. More specifically, the radial control unit (41) superimposes an instruction value corresponding to an excitation force, which is hereinafter referred to as an excitation force instruction value (Fe*), on an instruction value for a supporting force instructed to the first and second electromagnets (51, 52) that generate electromagnetic force in the X direction, which in turn generates a new instruction value. Examples of excitation force include a sine wave at frequency $\Omega$. The shaft (5) is excited by controlling the current flowing in the electromagnets (51 to 54) based on the newly generated instruction value.

Suppose that the control system of the radial magnetic bearing (21) has transfer characteristics indicating a gain of zero dB and a phase of zero degree at frequency $\Omega$ from when a new instruction value is input to when a supporting force of the electromagnets is exerted. In this case, the control system applies an additional force equivalent to the excitation force instruction value (Fe*) to the shaft (5). The output ($\delta$) of each radial displacement sensor (31) includes fluctuations due to noise in the static levitation and fluctuations due to excitation. In other words, in this example, the output of each radial displacement sensor (31) includes sine wave components at frequency $\Omega$.

The radial control unit (41) samples, as appropriate, the output ($\delta$) of a radial displacement sensor (31) for the first radial magnetic bearing (21) and the excitation force instruction value (Fe*) during excitation and performs a Fourier transform. Performing a Fourier transform can extract a component of frequency $\Omega$ contained in the displacement ($\delta$) in the X direction and a component of frequency $\Omega$ contained in the excitation force instruction value (Fe*).

In this example, the pseudo dynamic compliance (G') can be calculated by dividing an output ($\delta$) of a radial displacement sensor (31) by the excitation force instruction value (Fe*). Thus, the pseudo dynamic compliance (G') at frequency $\Omega$ can be calculated by using the result of the Fourier transformation. Specifically, the radial control unit (41) divides the component of frequency $\Omega$ contained in the displacement ($\delta$) in the X direction by the component of frequency $\Omega$ contained in the excitation force instruction value (Fe*) to obtain $G'_{11}(\Omega)$. Likewise, the radial control unit (41) divides the component of frequency Q contained in the displacement (δ) in the X direction detected by a radial displacement sensor (31) for a second radial magnetic bearing (21) by the component of frequency Ω contained in the excitation force instruction value (Fe*) to obtain $G'_{21}$ (Ω).

Moreover, the radial control unit (41) causes the first radial magnetic bearing (21) to excite the shaft (5) in the Y direction. The radial control unit (41) samples, as appropriate, the excitation force instruction value (Fe*) and the output (δ) of the other radial displacement sensor (31) during excitation, and calculates $G'_{11}(\Omega)$ and $G'21(\Omega)$ during the excitation in the Y direction. The radial control unit (41) calculates a mean of $G'_{11}(\Omega)$ obtained in the excitation in the X direction and $G'_{11}(\Omega)$ obtained in the excitation in the Y direction and determines the mean to be $G'_{11}(\Omega)$ of this magnetic bearing device. The radial control unit (41) also calculates a mean of $G'_{21}(\Omega)$ obtained in the excitation in the X direction and $G'_{21}(\Omega)$ obtained in the excitation in the Y direction and determines the mean to be $G'_{21}(\Omega)$ of this magnetic bearing device. Theoretically, the dynamic compliance (G) during the excitation in the X direction is equal to the dynamic compliance (G) during the excitation in the Y direction, and it may be considered that calculating either one of the dynamic compliances (G) is sufficient. However, in some cases, these dynamic compliances do not equate due to process-induced variations, and thus the radial control unit (41) in this example calculates a mean of data obtained in the excitation in the X direction and the Y direction.

Furthermore, upon excitation of the shaft (5) by the second radial magnetic bearing (21), $G'_{12}(\Omega)$ and $G'_{22}(\Omega)$ can be calculated. As described above, first, pseudo dynamic compliances $G'_{11}(\Omega)$, $G'_{21}(\Omega)$, $G'_{12}(\Omega)$, and $G'_{22}(\Omega)$ are obtained, and then, these pseudo dynamic compliances are converted into dynamic compliances $G_{11}(\Omega)$, $G_{21}(\Omega)$, $G_{12}(\Omega)$, and $G_{22}(\Omega)$ in accordance with the balancing of forces and moments, whereby influence coefficients $\alpha_{11}(\Omega)$, $\alpha_{21}(\Omega)$, $\alpha_{12}(\Omega)$, and $\alpha_{22}(\Omega)$ can be calculated by using expression (1). Once these influence coefficients (α) are obtained, the weight and position of a necessary balancing weight can be determined by a known method.

INDUSTRIAL APPLICABILITY

The present invention is advantageous to a magnetic bearing device and a fluid machine system using the magnetic bearing device.

DESCRIPTION OF REFERENCE CHARACTERS

1 Compressor (Fluid Machine System)
3 Compression Mechanism (Fluid Machine)
4 Motor (Rotary Electric Machine)
5 Shaft
10 Magnetic Bearing Device
21 Radial Magnetic Bearing (Magnetic Bearing)
22 Thrust Magnetic Bearing (Magnetic Bearing)
31 Radial Displacement Sensor (Displacement Sensor)
32 Thrust Displacement Sensor (Displacement Sensor)
40 Controller
51 First Electromagnet
52 Second Electromagnet
53 Third Electromagnet
54 Fourth Electromagnet
100 Air Conditioner
110 Refrigerant Circuit
160a Control Board

The invention claimed is:

1. A magnetic bearing device comprising:
a magnetic bearing including a plurality of electromagnets configured to apply electromagnetic force to a shaft connected to a rotary electric machine;
a displacement sensor configured to output an output signal in accordance with a displacement of the shaft; and
a controller configured to control the electromagnets, wherein
the controller compensates for a change in levels of the output signal in order to generate a compensated output signal, the change occurring in accordance with a change in ambient temperature around the displacement sensor, the compensation being based on one or more reference values correlating with the change in levels of the output signal, the one or more reference values being detected for use in controlling the rotary electric machine, a fluid machine system including the rotary electric machine, or an apparatus including the fluid machine system,
the controller controls the electromagnets based on the compensated output signal for the change in levels of the output signal,
the fluid machine system is a compressor provided to a refrigerant circuit,
the rotary electric machine is an electric motor for driving the compressor, and
the controller uses any one of detection values or a value obtained from a combination of two or more of the detection values as the one or more reference values, the detection values being a rotational speed of the rotary electric machine, a temperature detected in a control board on which a control device for the rotary electric machine is mounted, a refrigerant pressure and a refrigerant flow rate in the refrigerant circuit, and a current value of the rotary electric machine.

2. The magnetic bearing device of claim 1, wherein the controller compensates for the change in levels of the output signal by transforming the output signal using a transformation law including one or more parameters, and corrects the one or more parameters in accordance with the one or more reference values.

3. The magnetic bearing device of claim 2, wherein the controller corrects the one or more parameters by using a result of determination as to whether amplitudes of the one or more reference values are within a predetermined range.

4. A system comprising:
a fluid machine system;
a rotary electric machine; and
a magnetic bearing device including
a magnetic bearing including a plurality of electromagnets configured to apply electromagnetic force to a shaft connected to a rotary electric machine,
a displacement sensor configured to output an output signal in accordance with a displacement of the shaft, and
a controller configured to control the electromagnets, wherein
the controller compensates for a change in levels of the output signal in order to generate a compensated output signal, the change occurring in accordance with a change in ambient temperature around the displacement sensor, the compensation being based on one or more reference values correlating with the change in levels of the output signal, the one or more reference values being detected for use in controlling the rotary electric machine, the fluid machine system including the rotary electric machine, or said system, the controller controls the electromagnets based on the compensated output signal for the change in levels of the output signal, the fluid machine system is a compressor provided to a refrigerant circuit, the rotary electric machine is an electric motor for driving the compressor, and the controller uses any one of detection values or a value obtained from a combination of two or more of the detection values as the one or more reference values, the detection values being a rotational speed of the rotary electric machine, a temperature detected in a control board on which a control device for the rotary electric machine is mounted, a refrigerant pressure and a refrigerant flow rate in the refrigerant circuit, and a current value of the rotary electric machine.

5. The system of claim 4, wherein the controller compensates for the change in levels of the output signal by transforming the output signal using a transformation law including one or more parameters, and corrects the one or more parameters in accordance with the one or more reference values.

6. The system of claim 5, wherein the controller corrects the one or more parameters by using a result of determination as to whether amplitudes of the one or more reference values are within a predetermined range.

\* \* \* \* \*